Oct. 7, 1952  G. E. GRONEMEYER  2,613,166
THERMAL INSULATION
Filed March 11, 1949  8 Sheets-Sheet 1
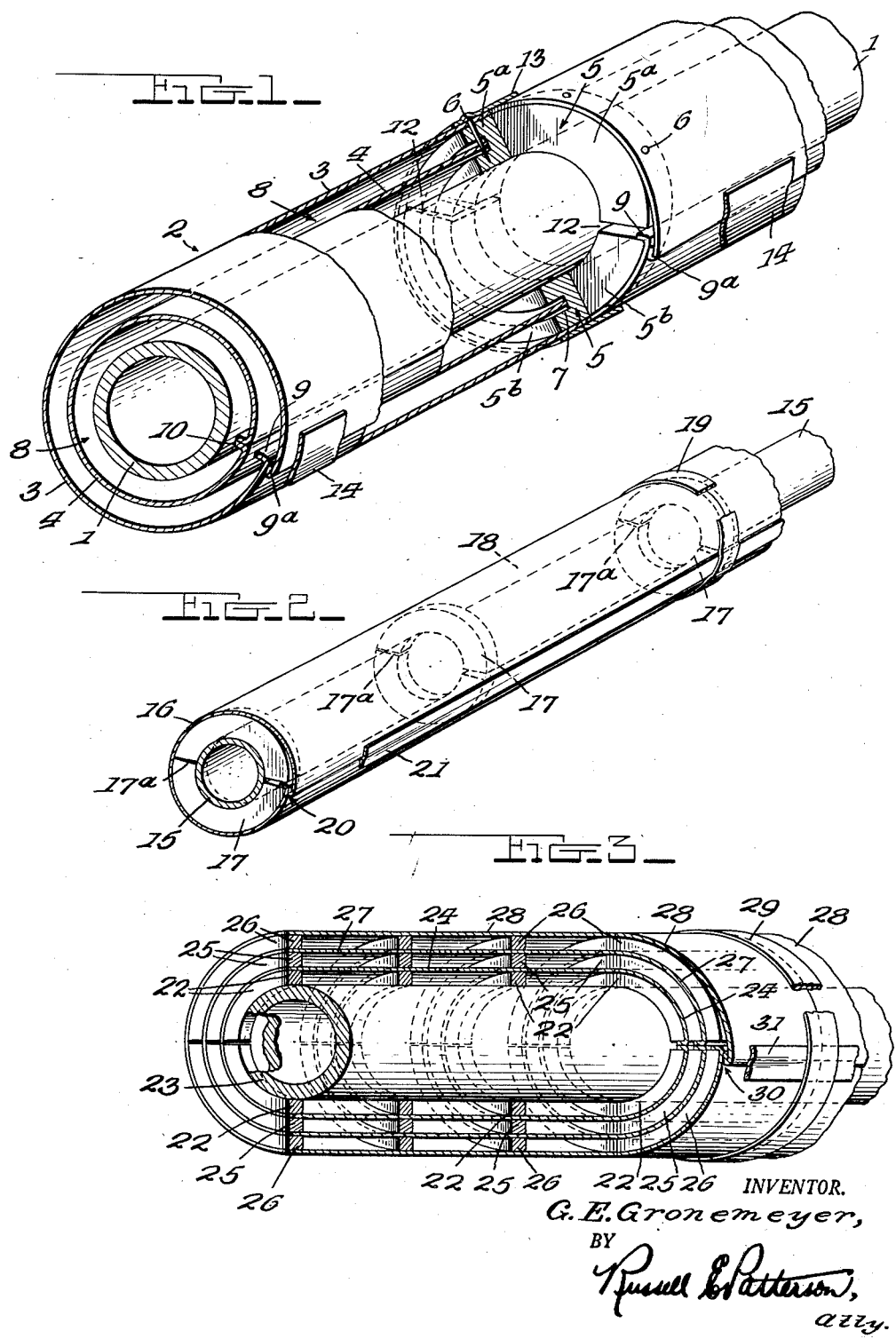
INVENTOR.
G. E. Gronemeyer,
BY
Russell E. Patterson,
atty.

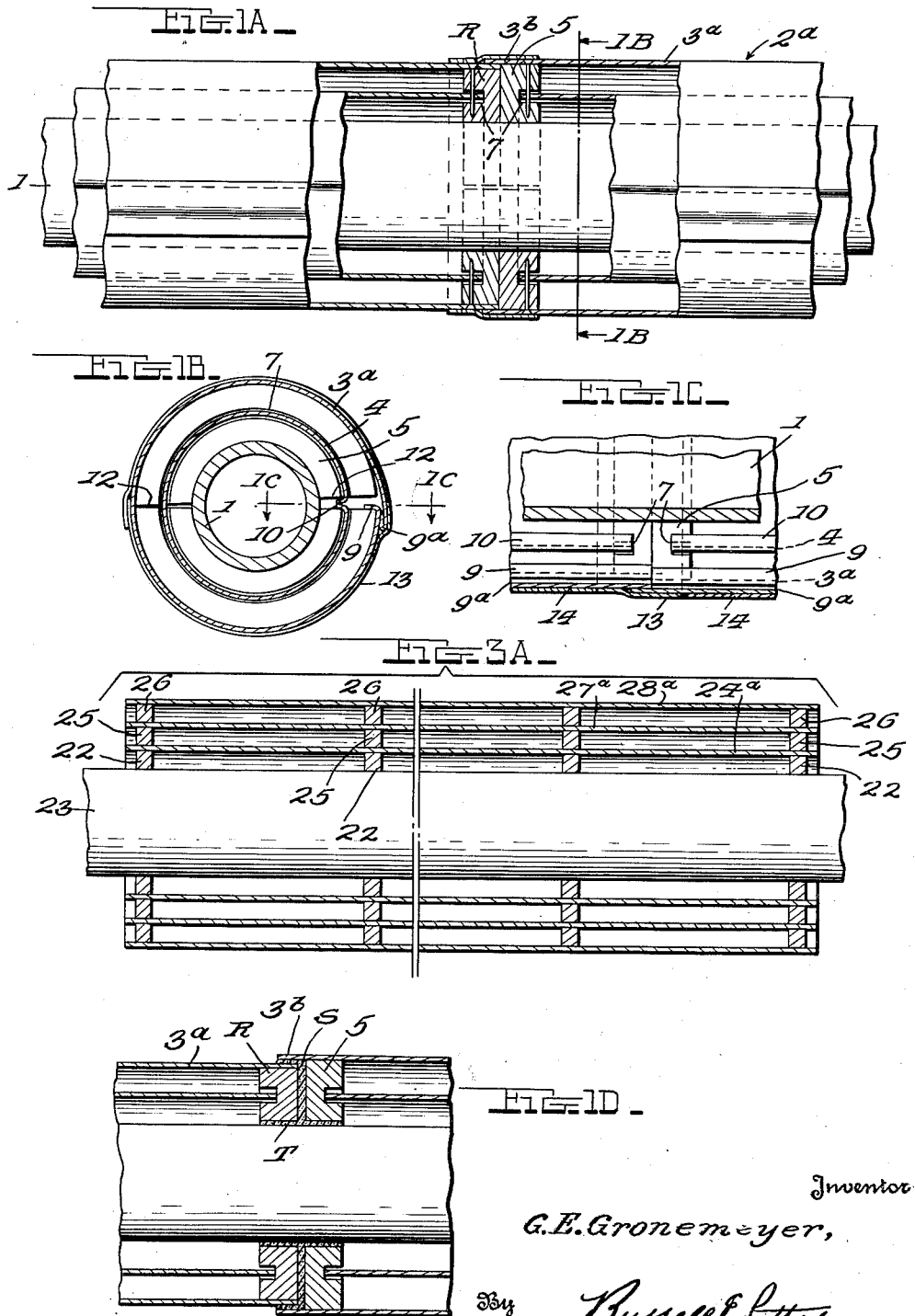

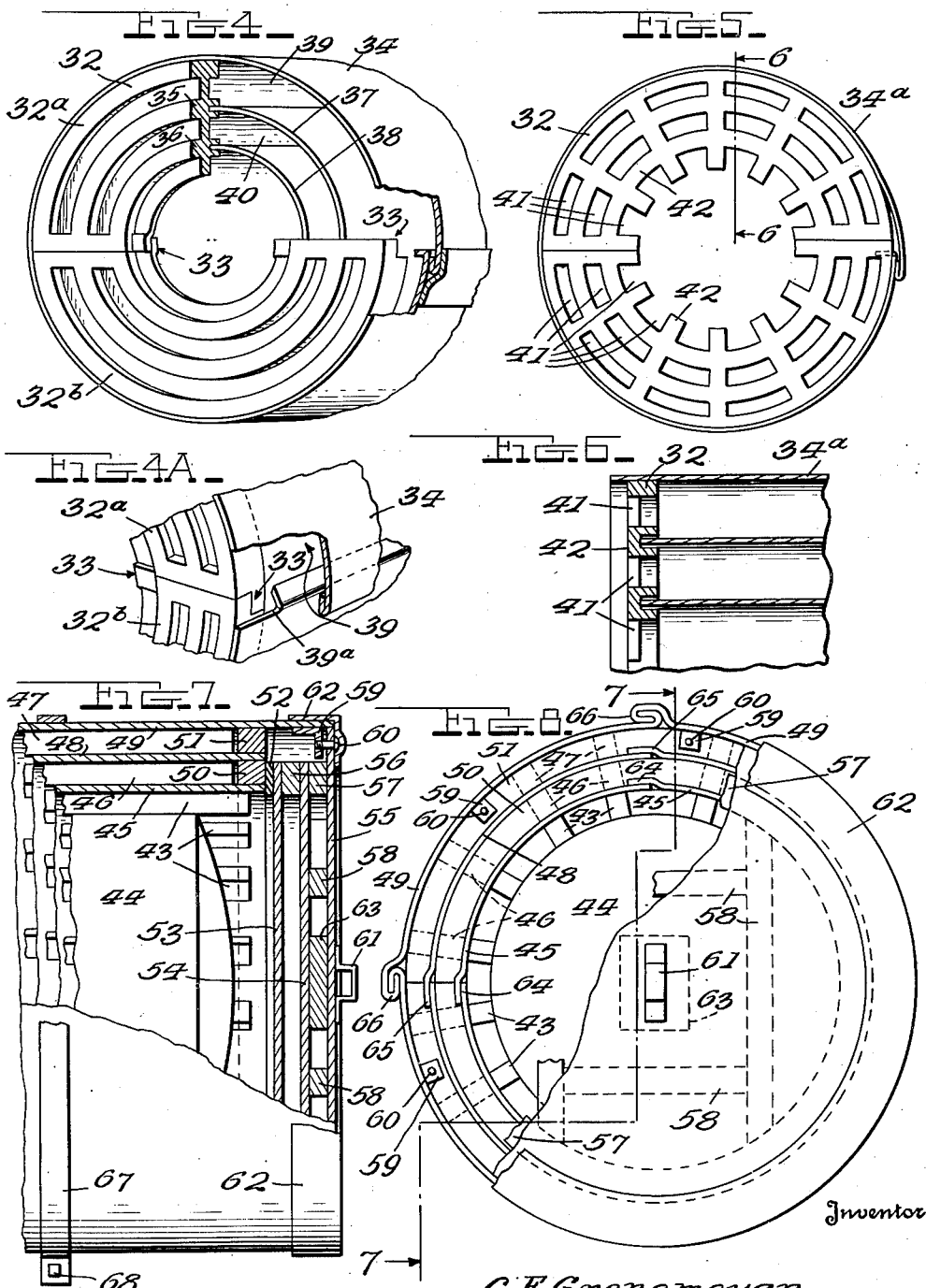

Oct. 7, 1952 G. E. GRONEMEYER 2,613,166
THERMAL INSULATION
Filed March 11, 1949 8 Sheets-Sheet 4
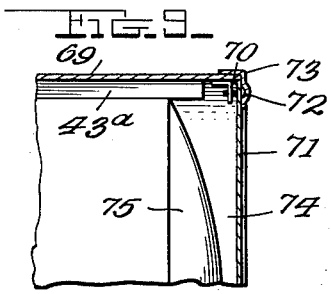
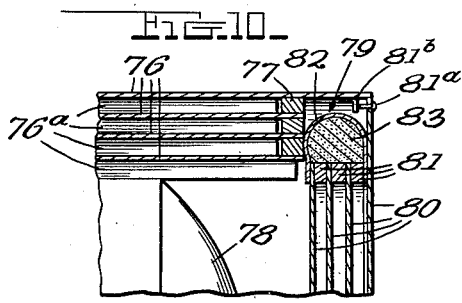
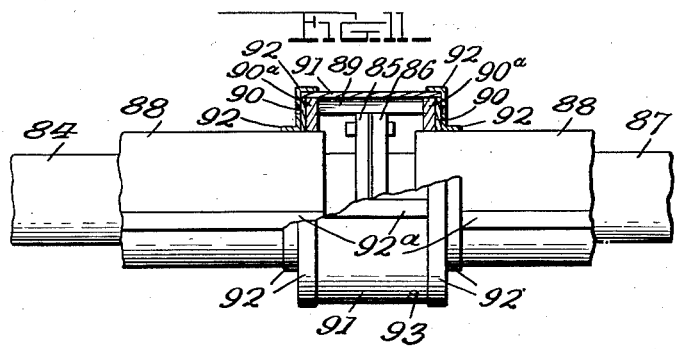
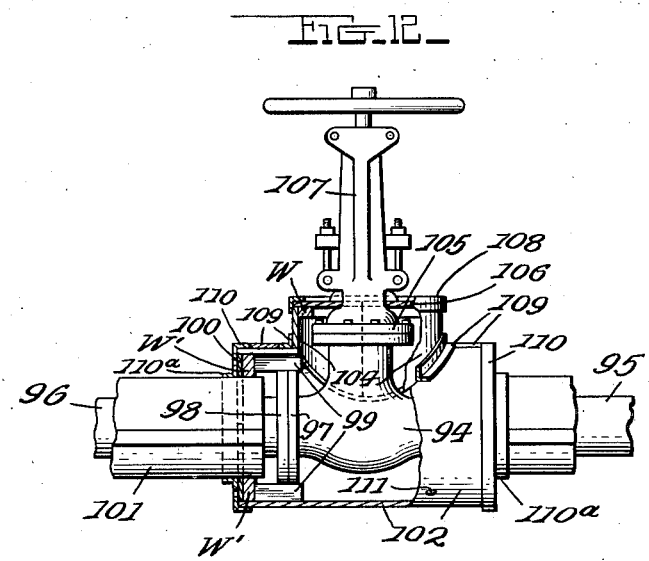
INVENTOR.
G. E. Gronemeyer,
BY
Russell Patterson,
atty.

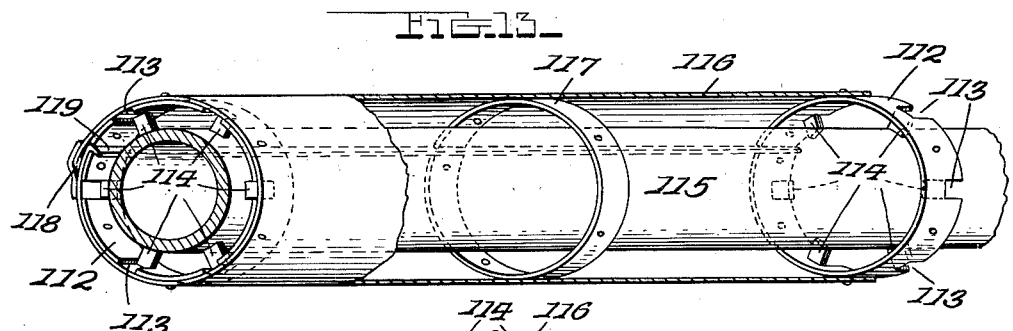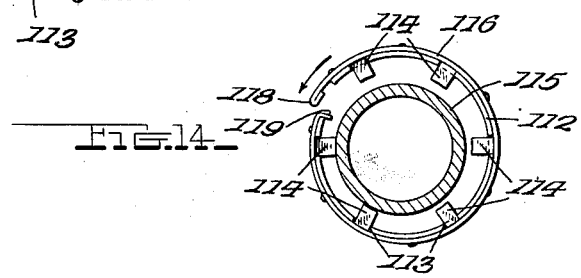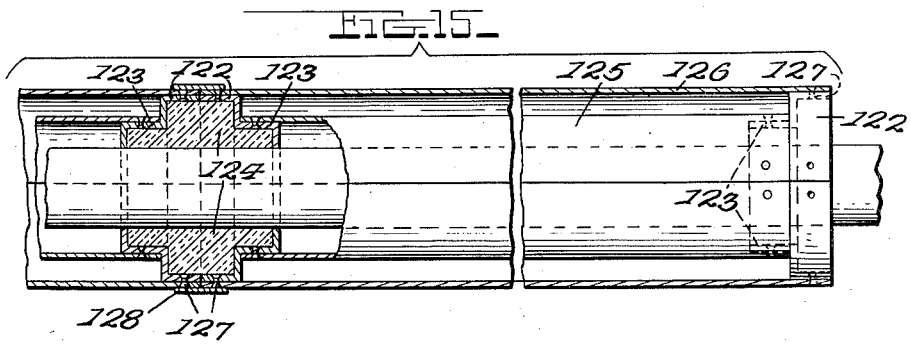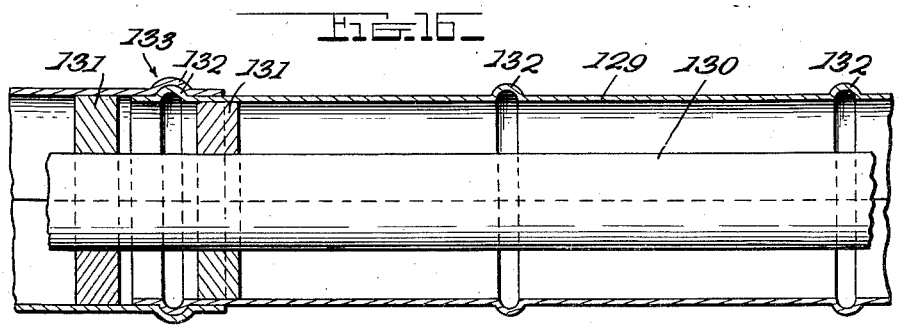

Oct. 7, 1952  G. E. GRONEMEYER  2,613,166
THERMAL INSULATION
Filed March 11, 1949  8 Sheets-Sheet 6
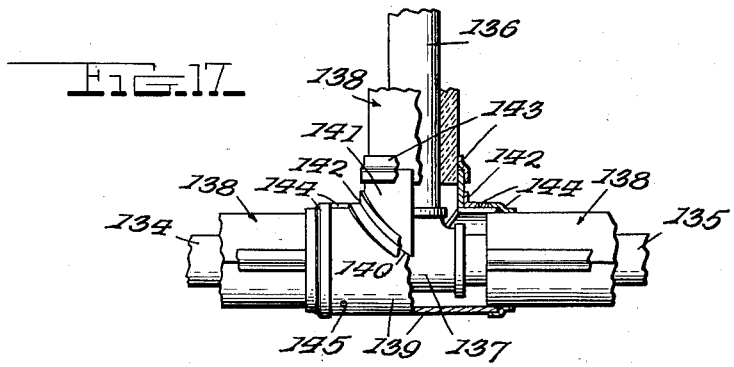
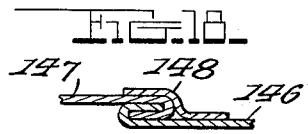 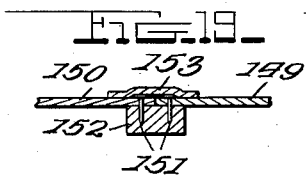 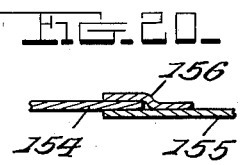
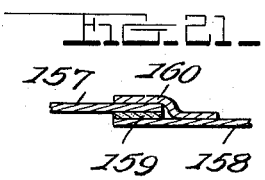 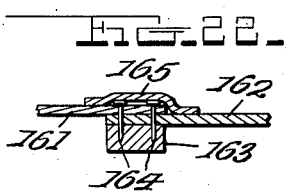 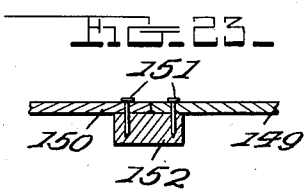
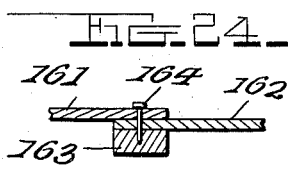  
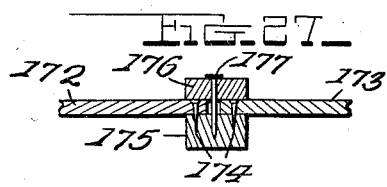
INVENTOR.
G. E. Gronemeyer,
BY
Russell E. Patterson,
atty.

Oct. 7, 1952 G. E. GRONEMEYER 2,613,166
THERMAL INSULATION
Filed March 11, 1949 8 Sheets-Sheet 7
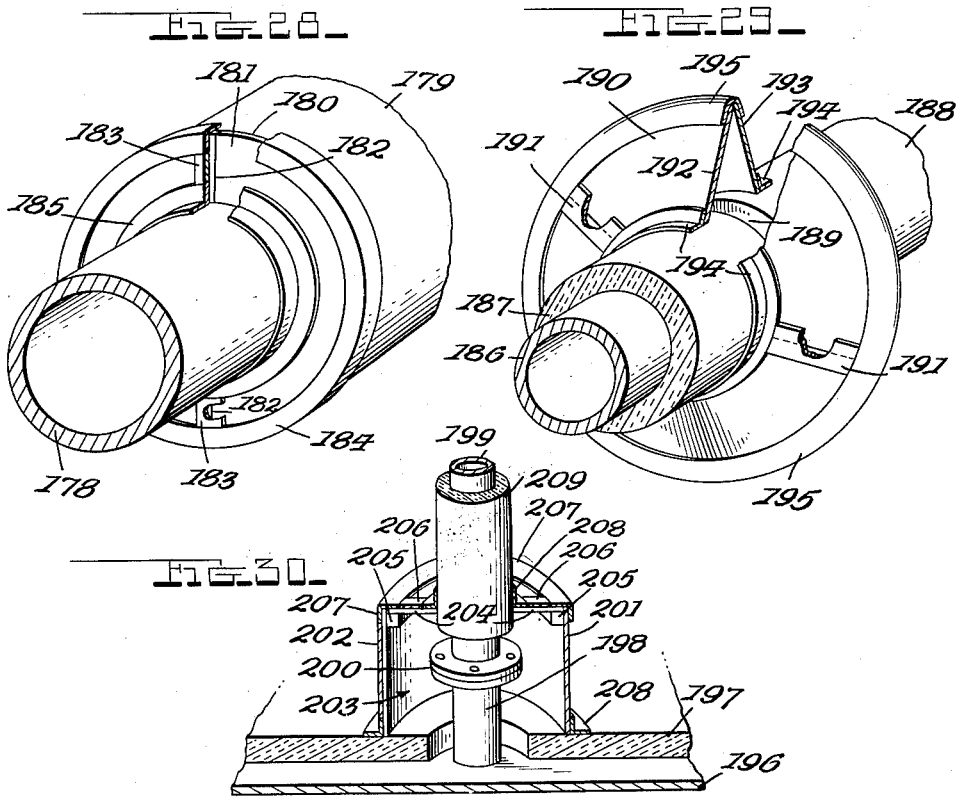
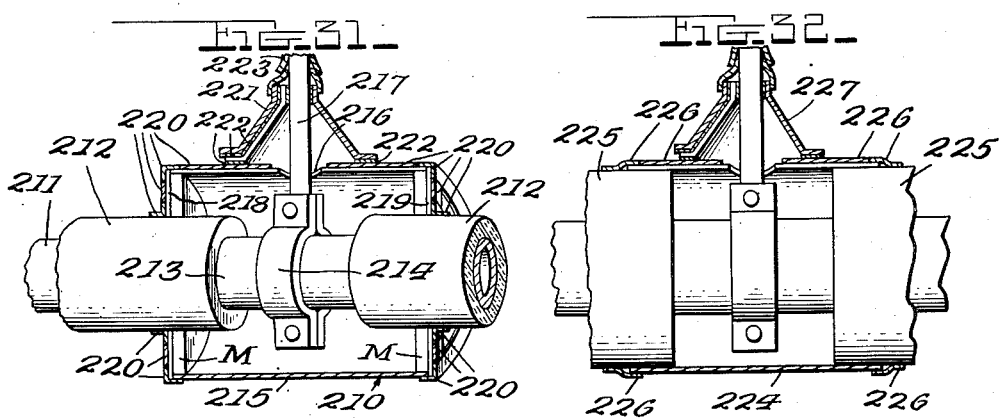
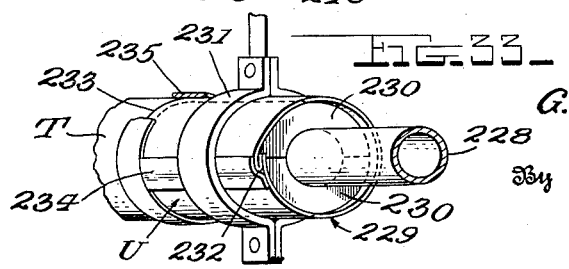

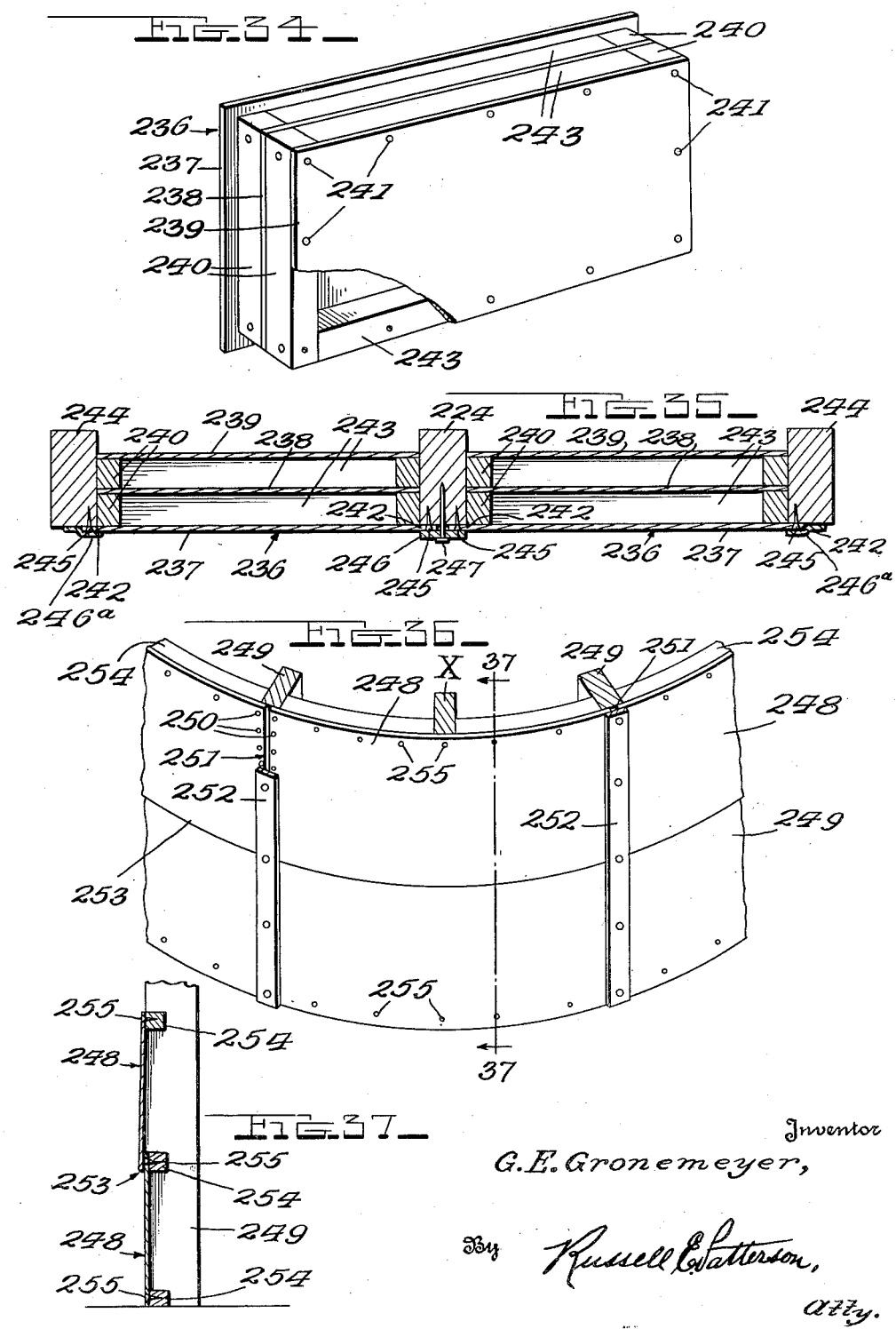

Patented Oct. 7, 1952

2,613,166

UNITED STATES PATENT OFFICE 2,613,166

THERMAL INSULATION

George E. Gronemeyer, Wilmington, Del.

Application March 11, 1949, Serial No. 80,896

8 Claims. (Cl. 154—45)

The present invention relates generally to thermal insulation and more particularly to a structure to be used as an insulator against heat and cold.

The thermal insulation in accordance with the present invention is designed for use in pipe coverings, pipe fittings such as valves, flanges, elbows, T's, unions and strainers; with tanks, power equipment, process equipment, ducts, building walls and ceilings, structural members and the like.

There are, of course, a number of well known structures for all of the above applications, some of which are patented. However, in the main, they have certain disadvantages such as being expensive to manufacture, difficult and irritating to handle in installation, improper fitting pipe covering, bulky and heavy, too rigid to conform to curved surfaces, soft, fragile, weak, dusty, costly to install and costly to maintain, costly and difficult to remove and displace, not fire-proof, vermin-proof, bacteria-proof. Furthermore, they have been found to be unattractive, not durable, and too limited in range or rate of change of operating temperatures, while becoming inefficient with age or when exposed to moisture or water. It should be noted that certain products commonly used as insulating materials may in a laboratory test meet some of these requirements. However, other auxiliary materials and field conditions and labor must be included in order to produce the installed insulation. Present insulations have many shortcomings when compared on the installed basis, which is the basis of true economic worth to the consumer.

An important object of the invention is to provide an improved insulation which will overcome the above-mentioned difficulties and which will provide other advantages to become hereinafter more apparent.

A further object of the invention is to provide an improved metal insulation which is fabricated in sections and units that are readily removable and replaceable without damage to the insulation, with an alternate construction for applications where non-sectional built-to-the-equipment insulation is used.

A further object of the invention is to provide a metal insulation which is adaptable for both hot and cold work and which can be installed more easily and cheaply than any of the structures heretofore known.

As will be hereinafter apparent, one feature of the invention resides in the use of reinforced heat reflective sheet metal which is sufficiently heavy to overcome the impracticability of thin foils heretofore tried without success. This heat reflective sheet metal is sufficiently thin to be economical, yet has a suitable analysis and temper to provide a high degree of resiliency in order to permit normal handling without permanent deformation and the resultant spoiled appearance.

Other features of the invention include the manner of attachment of spacers for positioning the reflector sheets, the method of holding the insulation in place on the pipe or equipment, the method of sealing joints against water, the method of providing for expansion and contraction of the equipment insulated and of the insulation, and the method of providing the vapor seal for cold insulation.

Other and further objects of the invention will become apparent from a reading of the following specification taken in conjunction with the drawings, in which Figure 1 is a perspective view partly in section illustrating one form of insulation applied to a pipe, there being shown one type of spacer ring;

Figure 1A is an elevational view with parts broken away illustrating overlapping ends of the outer sheet of insulating material for expansion purposes and using the form of spacer ring shown in Figure 1;

Figure 1B is a transverse sectional view taken substantially on line IB—IB of Figure 1A;

Figure 1C is a detail sectional view taken substantially on the line IC—IC of Figure 1B;

Figure 1D is a fragmentary sectional view of the form of insulation and spacer rings shown in Figure 1A and using a vapor-proof seal between the rings, insulation and pipe;

Figure 2 is a view similar to Figure 1 and illustrating a single sheet of heat reflective metal on a pipe using a different form of spacer ring;

Figure 3 is a view similar to Figure 2 and showing a plurality of sheets of heat reflective metal supported on the pipe using the type of spacer shown in Figure 2;

Figure 3A is a sectional view illustrating overlapping ends of the insulation for expansion purposes and using the form of spacer ring shown in Figure 3;

Figure 4 is an end elevation partly in section of a modified form of spacer ring;

Figure 4A is a fragmentary perspective view partly broken away to show the manner of notching the insulating sheet for positioning on the ring shown in Figure 4;

Figure 5 is an end elevation of a still further modified form of spacer ring;

Figure 6 is a detail sectional view taken substantially on the line 6—6 of Figure 5;

Figure 7 is a side elevational view partly in section illustrating the insulation in use with a tank;

Figure 8 is an end view of the insulated tank with parts broken away to show one method of joining the insulating sections;

Figure 9 is a view similar to Figure 7 but illustrating a single layer of sheet insulation applied to the tank;

Figure 10 is a fragmentary view of a tank insulation and illustrating four layers of insulating material and a method of insulating end corners of such insulation applied to cylindrical tanks;

Figure 11 is a front elevational view partly in section illustrating the insulation applied to form a flange cover;

Figure 12 is a front elevational view partly in section illustrating the insulation applied to form a flanged valve cover;

Figure 13 is a perspective view partly in section of a further modification of the spacer ring used with the metal insulating sheet;

Figure 14 is a view illustrating the position of the sheet when applying the same to a pipe;

Figure 15 is a sectional view with parts in elevation showing two sheets of insulation applied to a pipe and using step-down type spacer rings plus an insulating filler between the ends of adjacent sections of pipe insulation;

Figure 16 is a modified form of insulating sheet, the same produced by forming circumferential furrows in the insulating sheet;

Figure 17 is a front elevation partly in section illustrating the insulation applied to form a screwed fitting cover;

Figures 18, 19, 20, 21, 22, 23, 24, 25, 26 and 27 are detailed sectional views of various forms of joints for the metal insulating sheets;

Figure 28 is a fragmentary perspective view with parts broken away to illustrate a weatherproof end cover for exposed end of pipe or equipment insulation;

Figure 29 is a fragmentary perspective view with parts broken away of a modified form of expansion joint for pipe or equipment;

Figure 30 is a fragmentary sectional view illustrating a removable nozzle cover of heat reflective material;

Figure 31 is a sectional view of a removable pipe hanger cover of heat reflective metal sheet insulation for use where the pipe clamp extends beyond the outside diameter of the pipe insulation;

Figure 32 is a sectional view of a removable pipe hanger cover of heat reflective metal sheet insulation for use where the pipe clamp is enclosed within the outer diameter of pipe insulation;

Figure 33 is a fragmentary perspective view of an insulated pipe support unit utilizing heat reflective sheet metal insulation;

Figure 34 is a perspective view of an insulating medium in accordance with the present invention in the form of a removable panel section suitable for walls, ceilings, tank or equipment housings, large ducts and the like;

Figure 35 is a sectional view showing one method of installing the insulating panels illustrated in Figure 34;

Figure 36 is a partial perspective view illustrating another form of the insulation designed for application to walls, ceilings, large ducts, tank or equipment, housings and the like; and Figure 37 is a vertical sectional view taken substantially on line 37—37 of Figure 36 and illustrating the overlapping effect of the longitudinal edges of the panels shown therein.

As described herein, heat insulation is normally used to insulate something having temperatures above the dew point of the surrounding atmosphere. Cold insulation is normally used to insulate something having a temperature below the dew point of the surrounding atmosphere. The present invention has been designed for heat insulation, cold insulation, or heat and cold insulation. The insulation in accordance with the present invention is of the same general structure regardless of the use to which it is to be put. In cold insulation, however, a vaporproof seat is employed for the joining edges of the insulating structure.

In the several embodiments of the invention, the thicknesses of the metal insulating sheets are similar and an important feature of this invention resides in the thickness of these sheets. The inner sheets may range between .0035" and .010", and the outermost sheets may range between .006" and .032".

Another quality of this invention relates to the kind of materials used as spacers or separator strips to hold the metal insulating sheets in spaced relation. The materials used are strong and durable, of low heat conductivity, and fireproof.

While pipe and fitting insulating structures are preferably prefabricated in a manner so as to be readily installed on or removed from surfaces being insulated, it is also to be understood that such insulation may be installed directly on the surface, using each individual element of the unit.

Referring to the drawings for a more detailed description thereof, there is shown in Figure 1 a section of pipe 1 on which is mounted the new and improved thermal insulation generally designated by the reference numeral 2. The insulation 2 is preferably fabricated in a section or unit so as to be readily removable and replaceable without damage to the insulation and may embody the use of a single sheet or a plurality of sheets of resilient, highly heat reflective metal 3 and 4.

As shown in Figure 1 of the drawings, the insulation 2 is fabricated from the pair of highly heat reflective metal sheets 3 and 4, held in spaced relation by means of a pair of end spacer rings 5. The sheet 3 is attached to the outer periphery of spacer ring 5 by means of a nail, rivet or the like 6 and/or cemented in place, and said spacer ring 5 is formed with an annular groove 7 in one face thereof for receiving one end of the sheet 4. By this construction an air space 8 is formed between the pipe 1 and the sheet 4. The end of the sheet 4 which is located within the annular groove 7, is held in position by means of the nail, rivet or the like 6, and/or by means of cement. The longitudinal edges of the inner sheet 4 are formed inwardly, as indicated at 10 for safety and ease of handling, and to provide stiffened, spring-tight seams; and the longitudinal edges of the outer sheet 3 are formed for safety and ease of handling with a lip 9 turned in to provide a stiff straight backing for the overlapping edge 9a which may be folded double and which extends over the lip 9 to effect a tight closure.

As generally indicated, the air space 8 is established by means of the spacer ring 5, which ring is a strip or segment of material suitable for the temperature range involved and is of low heat conductivity. This spacer ring 5 is in the form of a disk made up of equal sections 5a and 5b having abutting joints 12, or said joints may be arranged in overlapping relation in a manner to be hereinafter described.

In the form of the invention shown in Figure 1, the spacer rings and sheets of each unit will be arranged around the pipe 1 in abutting relation, forming transverse seams at their meeting edges. As will be described in connection with the form of the invention shown in Figure 1A, these sections may telescope one upon the other to allow for normal expansion. However, as shown in Figure 1, when each section of the insulating unit 2 is applied to the pipe 1, the transverse seams of the outermost sheets 3 are sealed with a sealing tape or cement 13, intermediate transverse bands of tape (not shown) may be provided, and the longitudinal seams may also be sealed with a sealing tape 14 where conditions warrant. This sealing of the seams will secure the insulation in place, and will at the same time act to prevent admission of outside air within the insulation, thereby maintaining the quality of the insulation. Sealing of all joints and external seams is essential on cold insulation.

Referring now to Figures 1A, 1B and 1C, means have been provided for taking care of the normal expansion and contraction of the insulating sheets. This means comprises an extension 3B on the outer insulation casing sheet 3a, beyond the spacer ring 5 on one end of the insulating unit 2a, so as to lap over and enclose the flush casing on the abutting spacer ring R of the adjacent pipe section. In other words, the outer casing of each pipe insulation unit has a circumferential extended lip at one end of the section and the casing is flush with the outside face of the spacer ring at the other end of the section. Otherwise, the unit shown in Figures 1A, 1B and 1C is the same as that disclosed in Figure 1, and similar reference characters other than those specifically described, have been employed where the parts are identical. An alternate circumferential joint construction in which the outer metal insulating sheet is flush with the outer end of each end spacer ring of a pipe insulating unit, and expansion and contraction are taken in the circumferential joint seal between the insulating units, is also within the scope of this invention.

In Figure 2 of the drawings there is shown a section of pipe 15 having a single sheet 16 of metal mounted thereon of the same quality as described in connection with Figure 1. This sheet 16 is held spaced from the pipe 15 by means of spacer rings 17. The rings 17 are split segments having abutting joints 17a and when in position with the sheet 16 locked thereto, provide an air space 18 between the pipe and sheet. As in the preferred form shown in Figure 1, the transverse meeting edges of the sheets are closed by means of a sealing tape 19, and the overlapped longitudinal edges 20 may be closed by means of a sealing tape 21.

In Figure 3 of the drawings there is shown a further modification of the manner of supporting the sheets in spaced relation. It will be noted that spaced, split disks 22 are maintained in direct contact with the pipe 23 being insulated. These disks 22 support a metal insulating sheet 24 spaced from the pipe 23. Supported concentrically on each disk 22 are disks or spacer rings 25 and 26, the disks 25 maintaining a metal insulating sheet 27 spaced from the sheet 24 and the disks 26 maintaining a metal insulating sheet 28 spaced from the sheet 27. The insulating sheets 24, 27 and 28 are secured to the periphery of their respective rings or disks 22, 25 and 26 by adhesive and/or mechanical fastening means. The circumferential abutting edges of the outermost sheet 28 are united by means of an adhesive sealing tape 29, and the longitudinal overlapping edges 30 of these sheets 28 may be united by means of a sealing tape 31. In this form of the invention it will be seen that a plurality of the sheets of highly heat reflective insulating material are mounted in spaced relation on the pipe and are held in spaced relation by individual spacer rings or disks.

In Figure 3A of the drawings, the spacer rings or disks and sheets of insulating material are the same as disclosed in Figure 3. It will be noted, however, that the metal insulating sheets 24a, 27a and 28a extend beyond the end spacer rings at each end of the insulation unit. The purpose of the extending ends of the sheets is to allow for the adjacent unit to be telescopically received thereon, which will allow for normal expansion and contraction of the piping.

In Figure 4 of the drawings, there is shown a still further modified form of spacer ring or disk wherein it will be noted that a single ring at each end of an insulating unit is used for supporting three concentric layers of insulating metal. This spacer ring 32 is to be formed of sections 32a and 32b of equal sizes which, when united, form an overlapping meeting edge 33. The outermost sheet of insulation 34 is cemented or otherwise secured to the periphery of the ring 32. The intermediate portion of the ring is formed with slotted, web-like portions 35 and 36 for receiving and maintaining the insulating sheets 37 and 38 in spaced relation, said sheets being suitably secured in place. Air spaces 39 and 40 will be formed between the sheets, and when the entire unit is in position on the pipe, the circumferential edges will be, and the longitudinal edges may be closed by means of a sealing tape in the manner previously described for Figures 1, 2 and 3. The outermost sheet 34 has one longitudinal edge cut out as indicated at 39a for adapting itself to the peripheral contour of the ring 32.

In Figures 5 and 6 of the drawings there is shown a modification of the spacer ring or disk disclosed in Figure 4. This modification includes providing a series of relatively large openings 41 through the webs 42 of the ring in order to reduce the cross sectional area of the web and thereby reduce the radial heat conduction. This construction also reduces the amount of material in the rings and the corresponding material costs. It will be noted that the outermost insulating sheet 34a extends beyond the ring 32 in the same manner as disclosed in connection with Figures 1A and 3A.

Figures 7 and 8 illustrate the use of a plurality of metal insulating sheets supported about a boiler, cylindrical equipment or tank. A plurality of longitudinal separator strips 43 are disposed about a cylindrical tank 44. The innermost sheet of metal insulation 45 is suitably secured to the longitudinal separator strips 43, which strips may be secured to the tank or other surface being insulated in any desired manner.

Subsequent courses of longitudinal separator strips 46 and 47, and metal sheets 48 and 49 are secured to each other and to the sheet 45. In addition, spacer rings 50 and 51 are secured in place to close the annular air gaps between the metal sheets at each end of the cylindrical insulation enclosure. An annular gasket 52 is secured to the spacer ring 50 to provide a seal with the inner face of the end cover sheet 53. The annular space between the end cover sheet 55 and the outermost cylindrical insulating sheet 49 may be filled with rigid low heat conductivity material (not shown) secured either to the cylindrical insulation sections or to the end cover. The end covers for the insulating enclosure are made up of metal sheets 53, 54 and 55 separated by spacer rings 56 and 57, and suitably secured thereto. For large diameter equipment, separator strips 58 are provided which serve to reinforce the centralmost area at the end of the tank or equipment. To secure the insulating end assemblies in place, angle-shaped lugs 59 are attached to the outermost insulating sheet 49 for receiving metal screws 60 passing through the end sheet 55. Thus there is provided a direct connection between the outermost end insulating sheet 55 and the outermost circumferential insulating sheet 49.

The insulating sheet 55 may be termed a flat disk head cover, a handle 61 being attached thereto for facilitating handling the same. The meeting edges of the sheets 49 and 55 are sealed by means of a sealing tape or molding strip 62 which is cemented or otherwise secured thereto. A block 63 of suitable material is secured between the sheets 54 and 55 in any desired manner, said block forming a means for attaching and holding the handle 61 in place.

As shown in Figure 8 of the drawings, the sheet 45 is made up of two or more sections having overlapping joints 64 which may be closed mechanically or by cementing. Similarly, the intermediate sheet 48 is made up of sections having overlapping joints 65 and the outermost sheet 49 is made up of sections having interlocking joints 66, or lapping joints (not shown). These joints may be sealed with sealing tape or cement where conditions warrant. The outermost sheets 49 are generally of appreciably heavier construction than the inner sheets. The sectionally circumferential sections faced with sheet 49 are secured to the tank or insulated surface by means of metal bands 67, fastened by bolts 68. A spring, not shown, may be installed between the bolt 68 and the band flange to provide a spring loading of the band on large diameter vessels where considerable expansion is involved.

The cylindrical metal insulation casing on equipment such as shown in Figure 7 may have intermediate circumferential joints, not shown, if the equipment is of considerable length. In this case, spacer rings such as 50 and 51 may be installed to form a circumferential closure for each longitudinal panel, and to provide a firm base for sealing the joints by means of a molding strip, sealing tape, cement, or a circumferential support band 67.

In Figure 9 there is shown an insulation for a tank or equipment of the type illustrated in Figure 7, but using a single layer of metal sheet insulation. Longitudinal spacer strips 43a are employed to which the sheet of metal insulation 69 is adhesively secured. Attached to the end of the sheet 69 is an angle lug 70 to which a sheet of metal insulation 71 is attached by means of a screw or the like 72. A strip of sealing tape or the like 73 is applied to the joint of the sheets 69 and 71, said sealing tape also concealing the head of the screw 72. In this form of single layer insulation there will be provided an air space 74 between the head of the tank 75 and the insulating sheet 71. This type of insulation may be preferred with certain equipment.

In Figure 10 of the drawings there is shown an insulating unit similar to that shown in Figure 7. In this form of the invention, however, there are four or more metal insulating sheets designated by the reference numeral 76, which sheets are concentrically arranged in the manner described in connection with Figure 7. The sheets 76 are held in spaced relation by means of longitudinal spacer strips 76a and are secured thereto in any desired manner. Spacer rings 77 are secured in place to close the annular gaps between the metal sheet 76 at the end of the cylindrical insulation enclosure. The insulation for the head of the tank 78 differs slightly from that shown in Figure 7. An annular space 79 is provided by the outermost insulating sheet 76 and the outermost end insulating sheet 80. The insulation for the end of the tank consists of at least four sheets of metal insulation 80 separated one from the other by means of spacer rings 81. An annular ring 82 is confined within the annular space 79, said ring being preferably formed of glass cloth and filled with glass wool or slag wool 83. The function of the ring 82 is to provide a joint construction for hot work wherein the heat loss through the joint between the cylindrical insulation enclosure and the end cover will be reduced to a minimum, yet the end cover can be readily removed and replaced.

The end cover is secured in place by means of screws or the like 81a fastening to angle lugs 81b which are secured to the outer metal sheet 76. The joints of the sheet 76 and sheet 80 are sealed with sealing tape, cement or the like, not shown.

In Figure 11 of the drawings there is shown a metal insulating cover for a flanged joint in a pipe line. A section of pipe 84 carries a flange 85 which is coupled with a flange 86 of a section of pipe 87. The pipes 84 and 87 have been insulated with sections of insulation 88 of any rigid or semi-rigid type. To insulate the pipe flanges, a heat reflective sheet metal cover of one or more layers of sheet metal is provided. The single layer of construction shown consists of a wrapper sheet 91 and two annular end rings 90 which are split in two to permit springing the cover over the flange when installing a prefabricated insulating unit. These metal sheets are held together by securing them to low heat conductivity reinforcing rings 90a which are also split in two to match the annular metal end closures 90. Additional reinforcement of the insulating housing may be provided if desired, by securing to the housing longitudinal strips of low heat conductivity material 89. All external seams in the housing or cover and between the cover and adjacent insulation may be sealed with sealing tape, cement or the like 92 and 92a. An opening 93 is formed in the cover sheet 91 on heat insulation to serve as a drain hole and vent whereby liquid or vapor leakage from the pipe joint can be released.

In Figure 12 of the drawings there is shown a single layer insulating cover for a flanged valve, multi-layer construction being similar. The valve body is indicated by the reference numeral 94, the same being coupled with an inlet pipe 95 and an outlet pipe 96. Flange 97 is a part of the valve, there being similar flanges on the inlet and outlet sides of the body. The entire valve body, including the bonnet and bonnet flanges 105, as well as the companion flanges 97 and 98, is insulated in a single heat reflective metal insulating housing. This consists of a single circumferential wrapper sheet 102 having a longitudinal seam on the axis of the valve stem, said sheet having a split disk metal end closure 100, said sheet cut out to receive a split metal cylinder extension 104, and a flat split disk metal bonnet closure 106 between the extension cylinder 104 and the valve stem 107. All external joints in the housing are sealed with a sealing tape or cement 109 and 110, and a similar seal 110a is made between the end closures 100 and the adjacent pipe insulation 101. The joint between the valve bonnet closure 106 and the valve stem is sealed by weatherproof and vaporproof cement. In order to reinforce this metal cover to give satisfactory structural strength, split rings W and W' of low heat conductivity material are cemented into the 90° joints between the cylindrical housing sections 102 and 104, and the end closure sheets 100 and 106, respectively. Additional reinforcement of the insulating housing may be provided, if desired, by securing to the housing spaced longitudinal strips 99 of low heat conductivity material. Thus it will be seen that all exposed parts of the flanged valve body are suitably insulated along with the sections of pipe 95 and 96. A small opening 111 is formed in the sheet of insulating material 102 for draining and venting the cover, whereby leakage from liquid or vapor from the pipe or fitting joint can be released.

In Figures 13 and 14 of the drawing, there is shown a still further modified form of spacer ring to be used with pipe insulation. As shown, the rings 112 which are formed of metal are notched at spaced intervals as indicated at 113 to form fingers 114 which are adapted to contact the pipe 115 when the insulation is applied thereto. These fingers 114 which are adapted to contact the pipe pipe 115 but at an angle greater than 90° from the uncut side of the ring to impart some spring effect thereto so as to space a sheet of reflective metal insulation 116 therefrom. If desired, each unit may be provided with one or more intermediate stiffening rings 117 for adding rigidity to the insulating sheet 116.

As shown in Figure 14, the insulating unit is enveloped about the pipe with one longitudinal edge 118 of the sheet 116 brought into overlapping relation with the other edge 119 of said sheet. The joint details and manner of closing and sealing the joints in the metal insulating sheet are the same as described for the insulation shown in Figure 2.

In Figure 15 of the drawings there is shown a pipe insulation in which split spacer rings 122 of stepped formation are employed. These spacer rings are of uniformly thin cross section and have as many cylindrical steps 123 as there are intermediate insulating sheets. The rings are of generally annular formation and confine within the casing formed by the abutting rings an insulating medium 124 such as glass wool, slag wool or the like. The cylindrical steps 123 form surfaces to which are riveted or otherwise secured sheets of reflective metal insulation 125, and the outermost sheet 126 is riveted or otherwise secured as indicated at 127 to the periphery of said spacer rings. A sealing tape or cement 128 is used to seal the abutting circumferential edges of the outermost sheets 126 while the longitudinal edges thereof may also be sealed in this manner.

In Figure 16 of the drawings there is shown a modified form of insulating material. This sheet of insulating material 129 is held spaced from a pipe 130 by means of split spacer rings 131. It will be noted, however, that at spaced intervals said sheet of material is formed with annular corrugations 132. These corrugations 132 allow for expansion of the material while at the same time rendering the same more rigid; and due to this added rigidity the need for intermediate spacer rings for light gauge sheet metal insulation is also eliminated. Spacer rings such as those indicated at 131 will be required, and such rings are located at the adjoining ends of the strip of insulating material 129, and when the ends are brought into overlapping relation, one corrugation will interlock with the other as indicated at 133.

In Figure 17 of the drawings there is shown an insulating cover for a T fitting of a pipe connection. Horizontal pipes 134 and 135 are united with a vertical pipe 136 by means of the T fitting 137. The pipes 134, 135 and 136 are provided with a covering of insulation 138. In order to insulate the T fitting 137, there is provided a sheet of insulating material 139 split as indicated at 140 on the axis of the bend or branch. A second section of insulation 141 surrounds the vertical portion of the T fitting and is joined with the insulation 139 along the split 140. The meeting edges are sealed by means of sealing tape or cement 142. Likewise, a sealing tape is applied to the vertical extension, as indicated at 143, and to each of the horizontal extensions, as indicated at 144. Thus, all joints are effectively sealed with a weather-proof tape. On heat insulation, a drain or vent hole 145 is formed in the metal insulation 139 whereby liquid or vapor leakage from the pipe joint can be released.

In Figures 18 to 27 inclusive there are shown details of some of the various forms of joints which can be used on the metal insulation sheets. In Figure 18 the sheet of insulation 146 is secured to the sheet of insulation 147 by a lock joint construction, and the joint may, in turn, be sealed by a sealing tape 148.

Figure 19 shows a sheet of insulating material 149 brought into abutting relation with a sheet of insulating material 150, the abutting ends being secured by nails or the like 151 to a separator strip 152. The joint is then sealed with a strip of sealing tape 153, or if desired, a reflective metal trim strip, not shown, may be cemented in place in lieu of the sealing tape.

In Figure 20 the insulating sheets 154 and 155 are brought into overlapping relation and the lapped joint sealed by means of sealing tape 156.

In Figure 21 the insulating sheets 157 and 158 are brought into overlapping relation and secured together by a layer of cement or the like 159. The cemented lapped joint is then sealed by means of a sealing tape 160.

In Figure 22 of the drawings the sheet of insulation 161 overlaps the sheet of insulation 162 and is fastened to a separator strip or the like 163 by screws, staples or the like 164. The overlapping ends are sealed by means of a sealing tape 165.

Figure 23 is the same as Figure 19 of the drawings except that the sealing tape 153 or the metal trim strip has been eliminated.

Figure 24 is the same as Figure 22 except that the sealing tape 165 has been eliminated. The overlapping ends of the sheets 161 and 162 are fastened to the separator strip 163 by means of a nail, staple or the like 164.

In Figure 25 of the drawings the overlapping ends of the sheets 166 and 167 are fastened by a screw 168. Sealing tape, not shown, may or may not be applied to this lapped joint.

In Figure 26 of the drawings the overlapped ends of the sheets 169 and 170 are maintained in locked position by cement or the like 171.

In Figure 27 the insulating sheets 172 and 173 are brought into abutting relation and secured by nail or the like 174 to a separator strip 175. The joint is then sealed by a reflective metal trim strip 176 secured in place by nails, screws or the like 177.

In Figure 28 of the drawings there is shown a weather-proof end cover for the exposed end of pipe or equipment insulation. The pipe being insulated is indicated by the reference numeral 178 and the insulation by the reference numeral 179, the end 180 of which is to be exposed. This end 180 is closed by means of a disk 181 of low heat conductivity material. The disk 181 is split into sections of equal sizes which are brought into abutting relation as indicated at 182. The abutting joints 182 are sealed by a sealing tape 183 and the joint formed by contact of the ring or disk 181 with the insulation 179 is sealed by means of a sealing tape 184. A similar ring 185 of sealing tape seals the joint about the pipe 178 at the point where contact is made with the disk 181. In lieu of the sealing tape 183, 184 and 185, the entire end cover including the split disks 181 may be sealed with cement, in which case all joints would be caulked.

In Fig. 29 of the drawings there is shown a single layer insulation expansion joint for pipe or equipment, multi-layer construction being similar. The pipe 186 is provided with an insulation casing or finish 187 spaced from a similar insulating casing 188. The space or joint 189 formed between the casings 187 and 188 is concealed by means of a reflective sheet bellows 190. This bellows is made up of two segmental disks 192 and 193, the abutting joints of which are sealed with sealing tape or cement 191. Disk 192 engages with the insulation 187 and disk 193 engages with the insulation 188. Flexible sealing tape or cement 194 seals the joints between the disks of the ring 190 and the insulation 187 and 188, while an annular ring of sealing tape 195, or a mechanical joint (not shown) with or without cement, is positioned around the periphery of the metal ring 190 for sealing the joint thereof. By this construction it will be seen that the normal expansion and contraction of the piping and resulting movement of the insulation 187 and 188 may occur without affecting the seal provided for by means of the metal ring 190.

In Figure 30 of the drawings there is shown a single layer removable nozzle cover of reflective sheet insulation. The pipe or other equipment being insulated is indicated by the reference numeral 196 and the insulation thereon by the reference numeral 197. A nozzle 198 projects from the pipe or equipment 196 and is connected with an insulated pipe 199 through the flange coupling or joint 200. A cover of reflective sheet insulation 201 surrounds and is spaced from the nozzle 198, this cover being preferably made in one piece with the ends thereof overlapped and sealed with a sealing tape or other seal 202. The insulating cover 201 is positioned so as to provide an insulating air space 203. Split disks of reflective insulating sheet 204 form the top of the cover, and these disks are cemented or otherwise secured to a reinforcing ring 205 which is of low heat conductivity material. The radial joints of the cover are effectively sealed with a sealing tape 206, and a sealing tape 207 seals the joints between the insulating sheets 201 and 204. Likewise, rings of sealing tape 208 seal the joints between the insulation 197 and 201, also between 204 and 209. In lieu of the sealing tape, a sealing cement may be used. This cover is adapted to be readily removed from the nozzle when occasion demands.

In Figure 31 of the drawings there is shown a removable single layer insulating pipe hanger cover generally designated by the reference numeral 210. The pipe 211 is covered by a layer of insulation 212, and it will be noted that an area 213 thereof is exposed for receiving the pipe hanger 214. A portion of this hanger 214 extends beyond the diameter of the insulation 212. The insulating cover comprises a cylinder of heat reflective insulating material 215 which encloses the insulation 212 and entirely conceals the pipe hanger 214. A notch 216 is formed in the cylinder of insulating material 215 through which the pipe supporting rod 217 extends, this rod being connected to the pipe hanger 214 in any desired manner. The cover end closures are formed by split disks 218 and 219 which are united with the sheet 215 to form a complete enclosure. The disks and cylinder are held together by securing them to low heat conductivity reinforcing rings M which are also split to match the end closures 218 and 219. All joints are sealed with a sealing tape 220. In order to completely envelop the pipe supporting rod 217, a weatherproof hollow cone 221 is provided which is in the nature of a flexible membrane to permit movement of the hanger rod 217. This hollow cone 221 is sealed as indicated at 222 to the insulating cover, and a tape 223 or other means secures and seals the upper end of the cone around the supporting rod 217.

In Figure 32 of the drawings there is shown a removable pipe hanger cover of heat reflective sheet insulation for use where the pipe clamp is completely enclosed within the diameter of the insulation. A sheet of insulation 224 overlaps the pipe insulation 225 on either side of the pipe clamp and is sealed to the pipe insulation by means of a sealing tape or cement 226. The cone 227 is the same as the cone 221 described in connection with Figure 31 and is, of course, sealed to the insulation and rod in the manner previously described.

An alternate means of sealing the opening between the hanger rod and the pipe hanger cover for Figures 31 and 32 (not shown) is to flash or caulk the joint externally with an elastic cement.

In Figure 33 of the drawings there is shown a pipe 228 and pipe insulation T supported on a sheet metal encased insulating unit U. The supporting insulation consists of two half circles of rigid low heat conductivity material 230 of sufficient length to distribute the bearing load imposed upon it by the hanger 231. The sheet metal casing 229 is extended beyond the supporting insulation 230 to receive the adjacent pipe insulation T and to provide for the expansion and contraction of the insulated pipe structure. The hanger 231 surrounds the insulation 230, and the longitudinal and transverse seams 232 and 233 are sealed by means of sealing tape, or cement, 234 and 235 respectively.

Figure 1D of the drawings is substantially the same as Figure 1A with the exception that the joints between spacer rings 5 and R also between the rings 5 and the pipe at T are filled with a weatherproof and vaporproof cement S. This cement S also serves to seal the overlapping edge 3b to the outermost insulating sheet 3a to the ring R. In addition, a weatherproof and vaporproof tape (not shown) may be installed over the circumferential joint between sheets 3a and 3b.

Figure 34 shows the construction of an insulating panel generally designated by the reference numeral 236. These panels will be formed of a plurality of layers of heat reflective metal insulation, three sheets being shown in the illustration. The outer sheet is indicated at 237 and the two inner sheets are indicated at 238 and 239, said sheets being spaced apart by and secured to low heat conductivity strips 240 by nails, cement or the like 241. The spacer strips 240 are placed so that their outer edges are flush with the inner metal sheets 238 and 239 in order to enclose an air space between adjacent metal sheets, and the outer metal sheet 237 may be extended beyond the periphery of the inner metal sheets as shown, in order to form a flange 242 for mounting and supporting the panel. This mounting and supporting of the panels is shown in Figure 35. Horizontal spacer strips 243, in conjunction with the vertical spacer strips 240, form substantially a framework to which the sheets 237, 238 and 239 are attached. These panels may be flat as shown in Figures 34 and 35, or curved in form as shown in Figure 36. On large panels, intermediate reinforcing ribs (not shown) may be secured in place to stiffen the panel. These intermediate reinforcing ribs or spacers would be positioned between the spacers 240, or between the spacers 243.

Figure 35 is a sectional view showing one method of installing the panels illustrated in Figure 34. The insulating panels 236 are placed between columns or beams 244 and the extending flanges 242 may be secured in place by nails or the like 245. The exposed abutting seams and nail heads are covered with a molding strip 246 or sealing tape 246a. Where a molding strip is used, it is held in place by nails, screws or the like 247.

Figure 36 shows a method of constructing this insulation to form a partition wall or housing which may be curved or straight. This may consist of one or more layers of the insulation. The illustration depicts a curved surface provided with a single sheet of low heat conductivity metal insulation 248 which is attached to the principal supporting structural members 249 by nails or the like 250 along the joints 251 of the abutting sheets, said joints and nails being covered by a molding strip or sealing tape 252. Intermediate supporting members X may be provided, thereby permitting the use of large insulating metal sheets and providing the necessary rigidity for such construction. Figure 37 is a cross-section view of the insulating housing in Figure 36, showing how the insulating metal sheets are lapped to form seams 253 and the under edges of the lapped sheets are secured to the transverse bracing members 254 by nails or other means 255. It will be noted that seams 253 are lapped in one direction on vertical and inclined surfaces in order to provide a natural water shed, and said seams 253 may be cemented or caulked to seal the seam and secure the overlapping sheet along this edge.

In both of the aforesaid insulation constructions, the insulating sheets are fabricated to the structural supporting members and therefore they are not as readily removable and replaceable as is the case in other designs described heretofore. While the curved sheets disclosed in Figures 36 and 37 have been described as having lapped joints 253, it will be understood that it is within the meaning of this invention to have said joints abut and not overlapped, in which case the abutting joints would be sealed with a molding strip.

It will be understood that the various insulations described herein may be comprised of prefabricated units, or may be fabricated directly to the surface being insulated in individual elements.

Except for the bellows expansion joint Figure 29, all of the prefabricated pipe and pipe fitting insulating units heretofore described are designed whereby each unit is of one-piece construction so as to be sprung open clam shell fashion to snap on over the surface being insulated. However, where conditions warrant, it is within the scope of this invention to apply the design described to units constructed of two or more sections to form a complete encirclement of the item being insulated.

In all forms of the invention heretofore described, the sheets of metal insulation are understood to be formed of a resilient highly heat reflective metal such as aluminum, aluminum alloy, zinc alloy or the like. Where the temperatures involved are higher than these materials will endure, or where corrosive conditions dictate, sheets of stainless steel or the like are to be used for those zones involved. The air spaces between the sheets of insulating material and the pipe or equipment being insulated are established by means of spacers in the form of strips or segments of material suitable for the temperature range involved. The spacing between the metal sheets is varied to suit the physical and economic requirements, but is generally made between ½" and 1½".

Where the term "sealing tape" is used in the aforesaid description, it is to be understood that this implies an adhesive tape. For heat insulation it is to be further understood that said sealing tape is to be weatherproof; while for cold insulation, said sealing tape is to be both weatherproof and vaporproof.

Likewise, where the term "cement" is used in the aforesaid description, it is understood to be weatherproof in connection with heat insulation, and both weatherproof and vaporproof in connection with cold insulation.

On cold insulation, all joints or parts through which vapor or moisture could migrate to the cold surface or from one section of the insulation to another are sealed with a vaporproof tape or cement in order to produce a vaporproof assembly, wherever possible so sectionalized that should a break occur in the seal at any point the vapor penetration and loss of insulation efficiency will be localized.

While certain forms of the invention have been shown and described herewith, it will be readily apparent to those skilled in the art that many modifications may be made without departing from the spirit of the invention or the scope of the appended claims.

I claim:

1. A durable and readily removable and replaceable insulating structure comprising self-contained insulating units, each unit consisting of one or more layers of resilient heat reflective metal insulating sheets, means comprising a spacer ring formed of low heat conducting material having annular grooves to separate and receive the ends of the inner insulating sheets to form isolated air spaces, whereby said sheets are capable of freely expanding and contracting with temperature changes, means for compensating for the thermal expansion and contraction of the insulated structure, means for closing the joints and seams to render them weatherproof, and means for securing the units in position.

2. A structure as defined in claim 1, wherein the external joints and seams are sealed by a means which is both weatherproof and vaporproof, and wherein the internal joints and seams between the insulating units are sealed by a vaporproof means between the ends of adjacent units in such a way as to sectionalize the insulating structure into vaporproof units.

3. A structure as defined in claim 1 for insulating and enclosing the curved surface of a pipe, wherein the longitudinal edges of the metal sheets are flanged to form abutting edges so as to provide safety and ease of handling and to provide stiffened spring-tight seams in spaced relationship with the surface being insulated and forming isolated air spaces.

4. A structure as defined in claim 1 for insulating and enclosing the curved surface of a pipe, wherein the longitudinal edges of the metal sheets are flanged to form abutting edges so as to provide safety and ease of handling and to provide stiffened spring-tight seams in spaced relationship with the surface being insulated and forming isolated air spaces, means for sealing the external joints and seams so as to render them weatherproof and vaporproof, and vaporproof means between the ends of adjacent units for sealing the internal joints and seams between the insulating units so as to sectionalize the insulating structure into vaporproof units.

5. A structure as defined in claim 1 wherein a closure is to be provided for the exposed end of insulation, said closure comprising low heat conductivity spacer strips forming the end closure at the extreme portion of the insulation between the surface being insulated and the outermost heat reflective metal insulating sheet, means for sealing the joints, and means for sealing the entire face of the spacer strips to render them weatherproof and vaporproof.

6. A durable and readily removable and replaceable insulating cover unit for pipe fittings such as flanges, valves, elbows, T's, unions and laterals, said unit adapted to be positioned over the object being insulated and the adjacent pipe insulation, said unit comprising a housing formed of one or more layers of resilient heat reflective metal insulating sheets, means comprising a spacer ring formed of low heat conducting material having annular grooves to separate and receive the ends of the inner insulating sheets to form isolated air spaces, whereby said sheets are capable of freely expanding and contracting with temperature changes, means for reinforcing the housing, means for closing all openings, joints and seams, means for securing the unit in place, and means for sealing external joints and seams to render them weatherproof.

7. A removable insulating cover unit as defined in claim 6 wherein the external joints and seams are sealed by a means which is both weatherproof and vaporproof, and wherein the ends of the pipe insulating units are sealed by a vaporproof means in such a way as to vaporproof the pipe insulation from the interior of the insulating cover unit.

8. A removable insulating cover unit as defined in claim 6 to enclose pipe supports having a supporting member projecting through the insulation cover, and providing a low heat conductivity means to seal the cover to the supporting member where it projects through the cover.

GEORGE E. GRONEMEYER.

REFERENCES CITED

The following references are of record in the file of this patent:

UNITED STATES PATENTS

| Number | Name | Date |
|---|---|---|
| 798,649 | Willink | Sept. 5, 1905 |
| 1,060,328 | Farley | Apr. 29, 1913 |
| 1,762,276 | Schreier | June 10, 1930 |
| 1,890,418 | Schmidt | Dec. 6, 1932 |
| 1,964,795 | Frary | July 3, 1934 |
| 2,053,252 | Cook et al. | Sept. 8, 1936 |
| 2,078,606 | Legrand | Apr. 27, 1937 |
| 2,107,588 | Smith | Feb. 8, 1938 |
| 2,142,542 | Wallach | Jan. 3, 1939 |
| 2,324,181 | Tulien | July 13, 1943 |